254-307
OR RE 4,453
D. N. B. Coffin Jr.
Capstan & Windlass.
REISSUED JUL 4 1871
4453
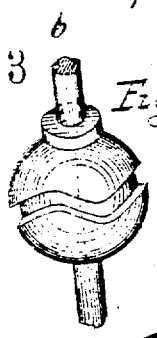
Fig. III.
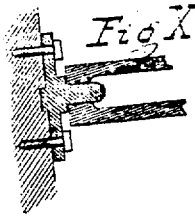
Fig. XV.
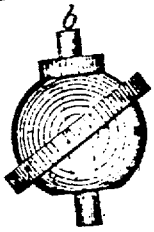
Fig. II.
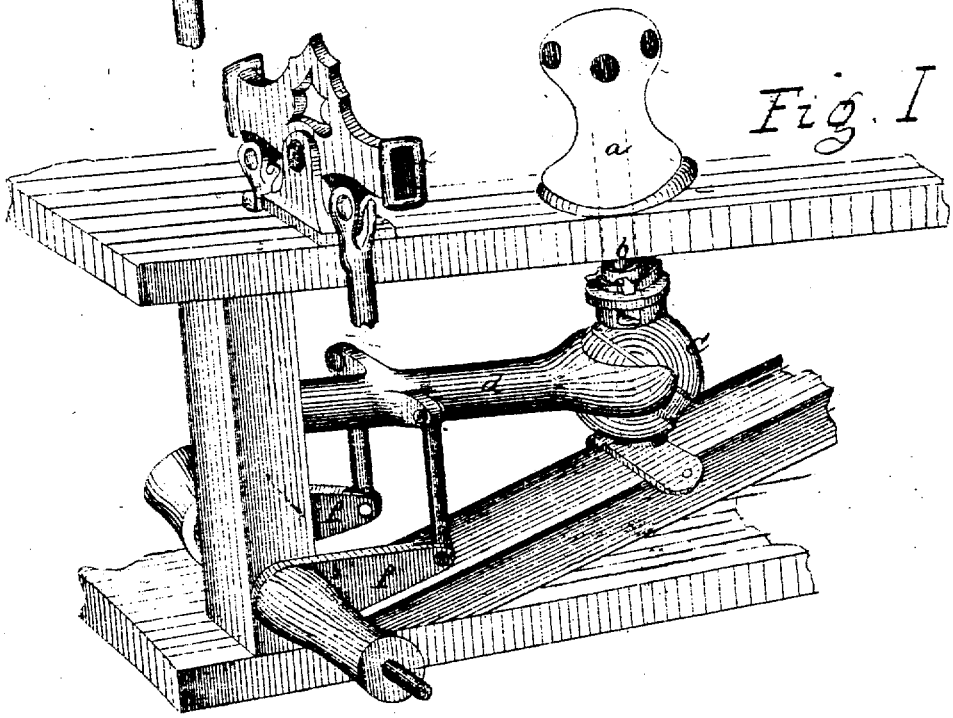
Fig. I
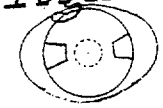
Fig. XVI
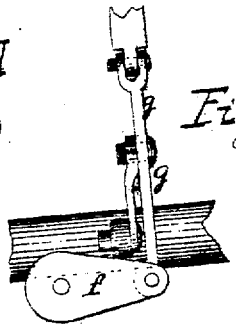
Fig. XI
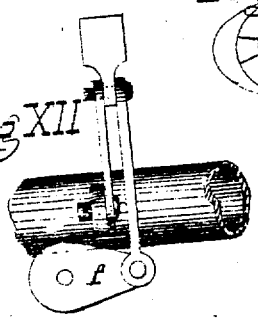
Fig. XII
D. N. B. Coffin Jr
Inventor
per Holloway & Co
Attys
Witness
A. Rippert
C. F. Ottersen
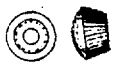
Fig. XII
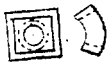
Fig. XVIII

D. N. B. COFFIN. JR.
CAPSTANS and WINDLASSES.
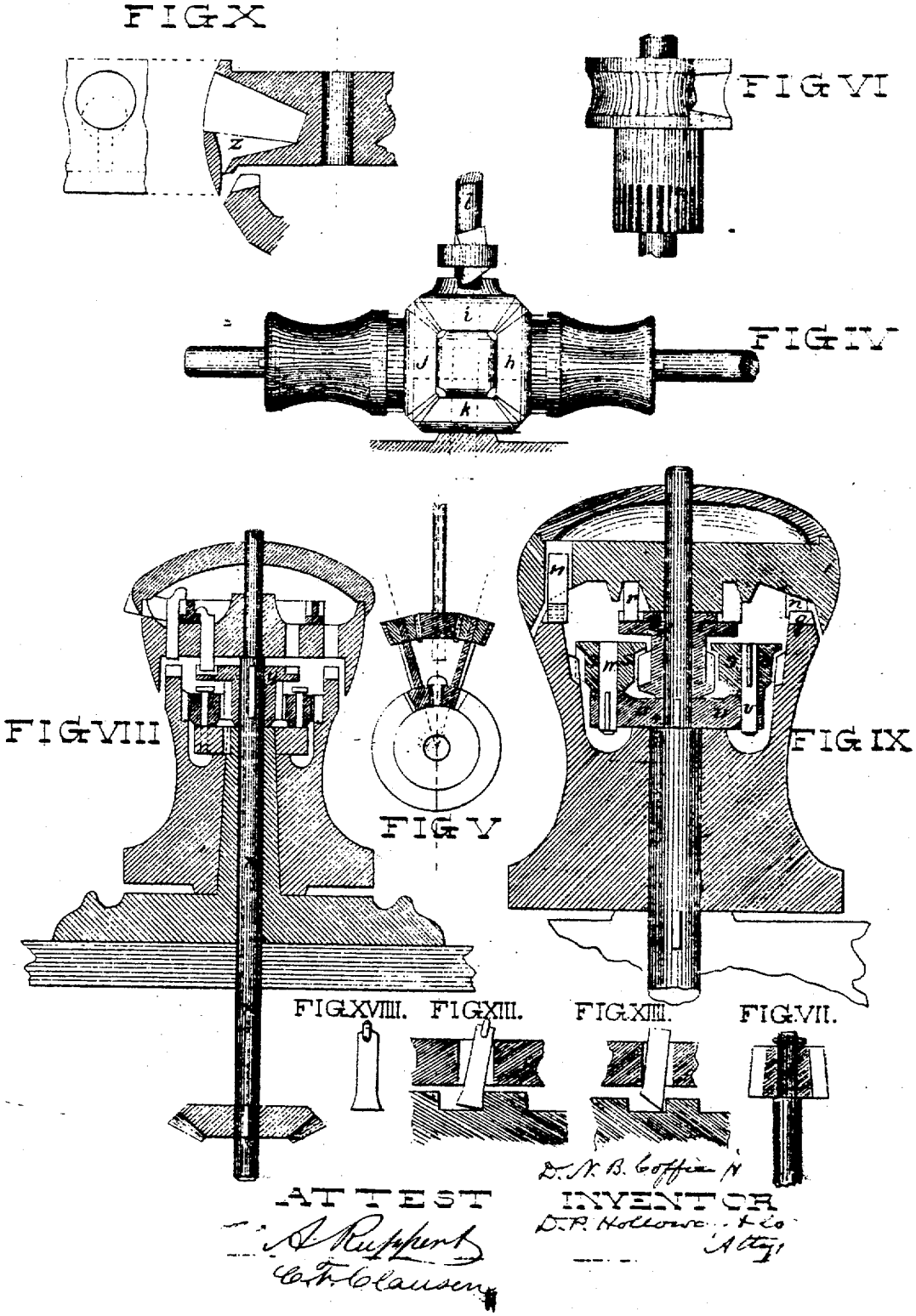

BEST AVAILABLE COPY

UNITED STATES PATENT OFFICE.

DAVID N. B. COFFIN, JR., OF NEWTON CENTRE, MASSACHUSETTS, ASSIGNOR, BY MESNE ASSIGNMENTS, TO HIMSELF AND BENJAMIN WOODWARD.

IMPROVEMENT IN CAPSTANS AND WINDLASSES.

Specification forming part of Letters Patent No. 98,032, dated December 21, 1869; reissue No. 4,453, dated July 4, 1871.

*To all whom it may concern:*

Be it known that I, DAVID N. B. COFFIN, Jr., of Newton Centre, in the county of Middlesex, and Boston, county of Suffolk, and State of Massachusetts, have invented certain Improvements in Capstans (Vertical Windlasses) and Windlasses (Horizontal Windlasses) and their combinations, of which the following is a specification:

The nature of the invention relates to improved construction in both capstan and windlass, and to improved means for operating both the (wooden) common windlass and the iron or geared or gear-wheel windlass; the object in view being to make them more effective, increase their facilities, and render more perfect the adaptation of this class of machines and their various parts to the various requirements connected with their construction and use, all as hereinafter more fully set forth.

Figure 1 is a perspective view illustrating the application of the capstan by an improved method to give impulse to the common pawl-case windlass. Fig. 2 shows a modification of cam *c;* Fig. 3, another. Figs. 12, 15, 11, 16, 17, and 18 illustrate details and modifications of the same system of mechanism. Fig. 4 is an elevation of the iron or gear-wheel windlass, showing its system of gear-wheels, windlass-shaft, and barrels, and capstan or driving-shaft, &c.; (chain-wheels or barrels may of course be substituted for the plain ones at pleasure.) Fig. 6 shows an automatic clutch for connecting the lever-head to center gear and disconnecting the same. Fig. 7 is a sectional view of a gear fitted to its shaft, with an interposed thin layer of softer metal not able to rust or corrode. Fig. 8 is a sectional view of a power or geared capstan. Fig. 9 is a similar view, but shows other improvements, not seen in Fig. 8. Fig. 10 is a sectional view of capstan lever-head and barrel, and illustrates the improved construction and arrangement of draining-channels for the inwardly-sloping lever-pockets. Fig. 13 is a sectional view, illustrating the construction and operation of the improved locking-bolts with expanded ends. Fig. 14 is a similar view, the bolt being provided with an oblique face or end, so as to slide over the lugs against which it operates when passing to the left. Fig. 19 is also a view of a bolt similar to the one in Fig. 13.

A capstan, *a*, of any kind, from which a central shaft may be extended to communicate its motion, is provided with such shaft *b*. On shaft *b* (see Fig. 1) is arranged a cam, *c*. This cam may have a single diagonal groove, as shown in this figure, or a flange, as shown in Fig. 2, or a waved groove or flange, as illustrated in Fig. 3; provided, however, that a high point and a low point of the cam-groove or flange shall be opposite in action to each other. This cam has a spherical or partly-spherical body, which adapts it to move within while embraced by the part *d*, which has an oscillating movement about an axis traversing at an angle its own axis of rotation. The cam may be secured permanently to shaft *b* in cases where the capstan is not to be used at all independently of the windlass. Otherwise a suitable clutch or locking-bolts and lifters, as illustrated in Fig. 1, are provided, whereby it may be readily connected or disconnected to or from the shaft *b*. In cases where the capstan is never required to rotate in but one direction independently of the windlass the clutch or locking-bolts may operate automatically to lock and release the cam to and from the shaft. For this purpose may be used the clutch of Fig. 6, or the automatic bolts of Figs. 4 and 9, the application of which will be readily understood; so that if the capstan is turned in one direction it is free to rotate, with its shaft *b*, independent of cam *c*, while if rotated in the opposite direction cam *c* is forced to rotate with it. A rocking or oscillating shaft, *d*, is arranged to so embrace or engage with the cam *c* as to receive impulse from its two opposite points of action simultaneously and from each in opposite directions. This gives the required rocking or oscillating motion to shaft *d*, and in such manner that the force does not tend to lift or depress the shaft *b* or cam *c*, as the resistance upon one side of the cam acts upward, while that upon the opposite acts downward with equal force, so bringing the strain upon the shaft *b* and cam *c* in a way most easily borne without displacement or damage. A suitable shoe or roller is pivoted to each part of the rocking-shaft, near the opposing points of action of the cam, and fitted to act in the cam-groove or upon the cam-flange, as the case may be; only, if the flange is used, rolls or a shoe must embrace it, so as to secure the double or balanced action. The opposite end of the rocking-shaft from the cam may be pivoted, as shown in Fig. 15, or furnished

BEST AVAILABLE COPY with a journal in any convenient manner. At any convenient point upon the shaft *d* a suitable head or arms, *e*, are attached, by casting or otherwise; and from this head or these arms *e* the desired reciprocating or vibratory motion is communicated to the pawl-cases or primary levers of a windlass, or to any other device for other required purposes. The levers *f* represent the pawl-cases, or other primary levers, or other devices for actuating a windlass by means of a vibratory motion.

When it is required to operate the windlass, rotary motion is given to the capstan *a* by means of levers or otherwise, and either with a simple or power purchase, as the occasion may require, so rotating shaft *b* and cam *c*, and thereby causing shaft *d* to oscillate. This oscillating or rocking motion of shaft *d* is communicated to the primary levers of the windlass either by direct connections, or by direct connections to the beam, (see Fig. 12,) or to the shackles *g*, which connect the beam to the primary levers *f*, or otherwise, as occasion may require.

In Fig. 9 is illustrated my improved mode of securing the proper flange-support for the teeth of intermediates *s*. These have never been provided with flange-supports to the teeth, probably owing to the absence of any known facility for applying the same so as to admit of the convenient taking apart and putting together of the parts of the capstan. The center gear is furnished with a space between its teeth, which are flanged at the lower end, and the plate *t*, or other adjacent parts, to admit the flange of the intermediates *s*, supporting the upper ends of the teeth. The gears *s* are then fixed upon shafts U, having bearings in head *u*, and which may be drawn out freely with the gears *s* when the center gear is withdrawn; or, instead thereof, studs *w* may be fixed in head *u*, and the gears *s* fitted to turn on, draw off, and slip on them without hindrance whenever the center gear is withdrawn, &c. Figs. 13 and 19 illustrate the construction and useful effect of my improved bolts with expanded ends for capstan and windlass purposes. The expanded ends, it will be noticed, prevent the bolts from slipping out or unlocking when in use. The front gives the proper upright face, while the back comes under the shoulder of its socket, and prevents it from slipping up notwithstanding that great looseness is allowed to prevent liability to rust in fast into the socket. The same principle is applied to the automatic bolts shown in Fig. 14, to which, however, it is not quite so well adapted, but serves well.

In Fig. 4 is illustrated my improved gear system for iron or geared windlasses. It is a matter of importance in the construction of this class of windlasses to reduce as much as possible the vertical space occupied, so that it shall not be necessary to place the decks between which it is located farther apart than is required for other uses. To accomplish this, produce a uniform, compact, and neat arrangement, I construct the system so as to embrace the four gears *h i j k*. Gear *i* is driven by the capstan or other shaft *l*. The gears *j* and *h* are on the windlass-shaft, one of them secured so as to drive the windlass-shaft or barrel, the other being free to turn without driving either directly, but transmitting the impulse received from gear *i* to gear *k*, and through it to that side of gear *h* or *j* opposite to gear *i*, so that gear *h* or *j*, whichever of the two is secured to the windlass-shaft or barrel, is driven by both gears *i* and *k*. This being effected, the gears *h* and *j* need be but half so large in diameter to secure the same driving strength as if driven only by one gear, as *i*. The gear *k* turns as a carrier upon a local pin or shaft, and by its use a large portion of the friction otherwise attaching to the large center bearing of the windlass is transferred to and reduced by the small bearing of gear *k*. The shaft *l* must be free to traverse in its lower bearing or guide so far as to make sure that the gear *i* shall act equally upon both gears *j h*. The lower bearing itself may be arranged to traverse with the shaft *l*, if preferred.

The fact should be mentioned, though perhaps sufficiently apparent, that the necessarily reversed motions of gears *j* and *h* afford all needful facilities for driving the windlass in either direction, according to which gear the windlass may be clutched or coupled to. This is an important and valuable feature in this system of gear, as it permits the windlass to be driven in either direction without changing the direction of motion of shaft *l*. For the purpose of adapting power capstans to be used not only by hand-lever power, but also at pleasure by steam or other power-driven machinery, I have conceived the device illustrated in Fig. 8, which illustration serves for any capstan in which the first moving gear has a central position. The central shaft *x* is made fast to the central prime moving gear *y* directly or through the lever-head, and is extended axially through the capstan and beyond to any suitable point of connection with steam-driven or other power machinery, and is provided with a gear or other connection to such moving mechanism.

Great difficulty is often found when it is required to separate the parts of capstans and windlasses which have become badly rusted by use under exposure to salt-water and air, the parts often breaking before they can be separated. To obviate this difficulty I insert in such joints, as that between the gear and its shaft shown in Fig. 7, (the gear being fixed so as not to turn on the shaft,) a thin layer of metal of a softer nature and less liable to rust or corrosion than the parts themselves, so that when it becomes necessary to separate the parts the layer of softer metal only is destroyed by forcing them apart, that being easily and cheaply replaced while the principal parts, as the gear and shaft are preserved from injury. The shading upon the shaft is intended to represent the soft metal which, for convenience, may be attached to either or neither part, at pleasure.

When the lever-pockets or sockets in the capstan are inclined, as in nearly all small capstans they must be to give the proper elevation to the levers, (hand-spikes or bars,) they have to be

BEST AVAILABLE COPY ovided with drainage so that they may not re-in water. In all the methods heretofore used e drainage-channels and pipes have been con-ucted with the discharging-orifice outside, or wn into the barrel of the capstan—the first sfiguring the exterior, the latter letting the ter inside to the serious damage of the inter-l mechanism. The improved channel differs m all such in being so constructed and ar-nged as to deliver the water inside the head, t in such relation to it and the other parts as trickle or flow down upon and drop off the ge of the head, or between it and the adjacent rrel or part, so falling outside of the capstan, d yet showing no aperture on the exterior. is improved drainage-channel is easily formed the process of casting, so that it has, in addi-n to its other advantages, the merit of inex-nsive construction.

In Fig. 9 is illustrated an improvement upon former invention, (since patented, March 15, 0,) wherein is substituted the bolts *n* and *m* the pawls used in that patent. These bolts ve their lower ends beveled, so as to slide over lugs in one direction, but in the opposite di-tion they engage bolt *m* with the lugs on gear nd bolts *n* with the lugs *q* on the barrel. These ts have the advantage that, while of less ex-nsive construction, their combination with the d and barrel, as shown, forms a connection, omatic like the pawls, but are unlike the vls in that there is no tendency to lift the head n the barrel. This tendency in the pawls is erious objection to their use, and one which is irely obviated by the automatic bolts. I have wn in Fig. 9 a pawl, *r*, playing upon the lugs gear *t*, which may sometimes be used, while automatic bolt *n* is used to engage with the rel-lugs.

For those cases where the breadth of space re-red for the bolts *m* or the pawls *r* cannot be rded, I have devised the arrangement of a tically-sliding ratchet-tooth clutch in the cen-chamber of the lever-head formed for its re-tion, and provided with means to compel its ing with the head. This clutch engages, n turned in one direction, with the corre-nding one formed upon the center gear of the stan and drives it, while in the other direc-it slides over freely without turning the gear, s acting, like the pawls and bolts, automatic-ally, while it may be made to occupy much less breadth of space.

The materials used in the construction of these improvements, not already mentioned, may be such as are common to the art.

I claim—

1. The combination of the gear-wheels *h i j k* with the horizontal windlass-shaft and the chain or rope-barrel of a windlass, substantially as and for the purpose set forth.

2. The combination and arrangement of the center gear *y*, its axial shaft *x*, the lever-head, and the barrel of a capstan, substantially as shown and described.

3. The drainage-channel Z, when so constructed, in connection with the lever-sockets, (or bar-holes,) as to deliver water from them through the joint between the lever-head and the adjacent part, (see Fig. 10,) substantially as described.

4. The automatic bolt or bolts *m*, in combination with the center gear-ratchet and lever-head, substantially as described.

5. The automatic bolt *n*, in combination with the ratchet *q* on the barrel and the lever-head, substantially as described.

6. The combination of the capstan, windlass, double-acting cam, and the rocking-shaft, substantially as described.

7. The combination and arrangement of the capstan-head *a*, double-acting cam *c*, rocking-shaft *d*, and vibrating arms *f f*, the parts being constructed substantially as set forth, and operating as described.

8. The combination of the oscillating lever, having in its ends sockets for the reception of levers and the vibrating arms *f f*, they being connected by rods, as shown, and arranged substantially as and for the purpose set forth.

9. The arrangement of the flanged intermediate gear or gears *s*, in combination with the space between the teeth of the center gear and its ratchet-plate or other adjacent part, substantially as described.

10. The construction of the locking or sliding bolts of a capstan (see Figs. 13, 14, and 19) with expanded ends, substantially as and for the purpose set forth.

DAVID N. B. COFFIN, JR.

Witnesses:

LYSANDER BURNETT,

E. E. HODSDON.